(12) United States Patent
Hershey et al.

(10) Patent No.: US 11,741,152 B2
(45) Date of Patent: Aug. 29, 2023

(54) OBJECT RECOGNITION AND DETECTION USING REINFORCEMENT LEARNING

(71) Applicant: Raytheon Company, Waltham, MA (US)

(72) Inventors: Paul C. Hershey, Ashburn, VA (US); Mu-Cheng Wang, Acton, MA (US); Michael L. Carroll, Allen, TX (US)

(73) Assignee: Raytheon Company, Waltham, MA (US)

( * ) Notice: Subject to any disclaimer, the term of this patent is extended or adjusted under 35 U.S.C. 154(b) by 269 days.

(21) Appl. No.: 17/038,983

(22) Filed: Sep. 30, 2020

(65) Prior Publication Data

US 2021/0271703 A1  Sep. 2, 2021

Related U.S. Application Data

(60) Provisional application No. 62/911,613, filed on Oct. 7, 2019.

(51) Int. Cl.
*G06F 16/532* (2019.01)
*G06T 11/00* (2006.01)
(Continued)

(52) U.S. Cl.
CPC ............ *G06F 16/53* (2019.01); *G06F 16/532* (2019.01); *G06N 20/00* (2019.01); *G06T 11/00* (2013.01);
(Continued)

(58) Field of Classification Search
CPC .......... G06F 16/50; G06F 16/55; G06F 16/58; G06F 16/583; G06F 16/5838; G06F 16/5846; G06F 16/5854; G06F 16/5862; G06F 16/5866; G06F 16/587; G06K 9/6267; G06K 9/6228; G06K 9/6217;
(Continued)

(56) References Cited

U.S. PATENT DOCUMENTS 5,392,365 A   2/1995   Steinkirchner
5,491,510 A   2/1996   Gove
(Continued)

OTHER PUBLICATIONS

U.S. Appl. No. 14/809,352, filed Jul. 27, 2015, System and Method for Global Object Recognition.
(Continued)

*Primary Examiner* — Sumati Lefkowitz
*Assistant Examiner* — Michael Adam Shariff
(74) *Attorney, Agent, or Firm* — Schwegman Lundberg & Woessner, P.A.

(57) ABSTRACT

Discussed generally are techniques for managing operation of programs in a sequential order. A method can include receiving a query for an image, the query indicating characteristics of the image, selecting a chain of algorithms configured to identify the image based on the characteristics, operating an algorithm of the selected chain of algorithms that operate in increased fidelity order on an input to produce a first result, operating a ground truth algorithm on the input to generate a second result, comparing the first and second results to determine a probability of correctness (Pc) and confidence interval (CI) for the algorithm, and altering the chain of algorithms based on the determined Pc and CI.

20 Claims, 8 Drawing Sheets

(51) Int. Cl.

| | |
|---|---|
| *G06N 20/00* | (2019.01) |
| *G06V 10/764* | (2022.01) |
| *G06F 16/53* | (2019.01) |
| *G06V 10/80* | (2022.01) |
| *G06V 10/82* | (2022.01) |
| *G06V 20/64* | (2022.01) |
| *G06F 18/22* | (2023.01) |
| *G06F 18/21* | (2023.01) |
| *G06V 10/56* | (2022.01) |
| *G06V 10/46* | (2022.01) |
| *G06V 40/10* | (2022.01) |

(52) U.S. Cl.
CPC .......... *G06V 10/764* (2022.01); *G06V 10/809* (2022.01); *G06V 10/82* (2022.01); *G06V 20/647* (2022.01); *G06F 18/2193* (2023.01); *G06F 18/22* (2023.01); *G06T 2200/24* (2013.01); *G06V 10/46* (2022.01); *G06V 10/56* (2022.01); *G06V 40/10* (2022.01)

(58) Field of Classification Search
CPC .. G06K 9/6262; G06K 9/6263; G06K 9/6264; G06K 9/6265; G06K 9/62; G06K 9/6201; G06K 9/6215; G06V 10/70; G06V 2201/10; G06V 10/776; G06V 10/778; G06V 30/1916; G06V 30/19167; G06V 30/302; G06V 10/7784; G06V 10/7796; G06V 30/194; G06V 10/766; G06V 30/19; G06V 10/75; G06V 30/19007; G06V 10/761; G06V 30/19093; G06V 10/454; G06V 10/82; G06N 7/005; G06N 20/00; G06N 3/02; G06N 3/08; G06N 3/0454; G06N 3/04; G06T 2207/20084
See application file for complete search history.

(56) References Cited

U.S. PATENT DOCUMENTS

| | | | |
|---|---|---|---|
| 6,578,017 | B1 | 6/2003 | Ebersole |
| 8,768,313 | B2 | 7/2014 | Rodriguez |
| 8,886,206 | B2 | 11/2014 | Lord et al. |
| 9,128,708 | B2 | 9/2015 | Lan et al. |
| 9,305,024 | B2 | 4/2016 | Tseng |
| 2002/0102966 | A1 | 8/2002 | Lev et al. |
| 2011/0034176 | A1 | 2/2011 | Lord et al. |
| 2011/0143811 | A1 | 6/2011 | Rodriguez |
| 2011/0212717 | A1 | 9/2011 | Rhoads et al. |
| 2011/0279453 | A1 | 11/2011 | Murphy et al. |
| 2012/0011119 | A1 | 1/2012 | Baheti et al. |
| 2012/0011142 | A1 | 1/2012 | Baheti et al. |
| 2012/0310968 | A1 | 12/2012 | Tseng et al. |
| 2014/0236851 | A1 | 8/2014 | Barrington et al. |
| 2015/0011194 | A1 | 1/2015 | Rodriguez |
| 2015/0199383 | A1 | 7/2015 | Roimela |
| 2016/0070674 | A1 | 3/2016 | Hershey et al. |
| 2017/0200090 | A1* | 7/2017 | Hershey ................. G06N 7/005 |
| 2018/0232644 | A1* | 8/2018 | Acharya ................ G06N 20/00 |

OTHER PUBLICATIONS

"Airborne Support Data Extentions (ASDE), Version 1.1", (Nov. 2000), 58-59.
"U.S. Appl. No. 14/809,352, Final Office Action dated Apr. 4, 2018", 14 pgs.
"U.S. Appl. No. 14/809,352, Non Final Office Action dated Nov. 29, 2017", 18 pgs.
"U.S. Appl. No. 14/809,352, Preliminary Amendment filed Mar. 7, 2016", 9 pgs.
"U.S. Appl. No. 14/809,352, Response filed Jan. 10, 2018 to Non Office Action dated Nov. 29, 2017", 14 pgs.

"Smart Object Recognition Algorithm Doesn't Need Humans", Brigham Young University, [Online]. Retrieved from the Internet: <URL: http://www.sciencedaily.com/releases/2014/01/140116091147.htm>, (Accessed Apr. 11, 2014), 3 pgs.
Baik, Sung, et al., "Application of Adaptive Object Recognition Approach to Aerial Surveillance Proceedings of the Fifth International Conference on Information Fusion, Jul. 8-11, 2002, IEEE Publisher, pp. 658-663.", Proceedings of the Fifth International Conference on Information Fusion, IEEE Publisher, (2002), 658-663.
Blaschke, Thomas, et al., "Geographic Object-Based Image Analysis—Towards a new paradigm", J Photogramm Remote Sens., 87(100), (Jan. 2014), 20 pgs.
Brummit, Chris, et al., "Malaysia defends Search for Missing Jet", [Online]. Retrieved from the Internet: <URL: http://news.msn.com/world/ malaysia-defends-search-for-missing-jet.>, (Accessed Mar. 20, 2014), 8 pgs.
Chapa, Joseph, et al., "A Stochastic Model for Estimating Ballistic Missile Negation via Left of Launch Techniques", Raytheon Company, (Mar. 5, 2015), 16 pgs.
Chen, Jianwen, et al., "Scrubbing Query Results from Probabilistic Databases", Ideas 11, (2011), 79-87.
Diaconis, Persi, et al., "Some Alternatives to Bayes' Rule", Technical Report No. 205. Department of Statistics, Stanford University, (Oct. 1983), 16 pgs.
Dou, Edward, "Automatic Target Recognition: Bringing Academic Progression into the Aerospace Industry", Raytheon MEOSTN Symposium, (2015), 12 pgs.
Doulkeridis, Christos, et al., "A survey of large-scale analytical query processing in MapReduce", The VLDB Journal, 23, (2014), 355-380.
Ghodsnia, P, "An In-GPU-Memory Column-Oriented Database for Processing Analytical Workloads", Presented at The VLDB 12 PhD Workshop., (2012), 54-59.
Hershey, Paul, et al., "Composable, Distributed System to Derive Actionable Mission Information from Intelligence, Surveillance, and Reconnaissance (ISR) Data", IEEE, (2013), 8 pgs.
Hershey, Paul, et al., "System for Local/Regional/Global Joined Object Recognition", IEEE, (2015), 747-753.
Innis, Michelle, et al., "Newly Detected Objects Draw Searchers for Malaysian Plane", The New York Times., [Online]. Retrieved from the Internet: <URL: http://www.nytimes.com/2014/03/20/world/asia/missing-malaysia-flight . . . >, (Accessed Apr. 11, 2014), 4 pgs.
Levachkine, S, et al., "Simultaneous Segmentation-Recognition-Vectorization of Meaningful Geographical Object in Geo-Images", CIARP, LNCS 2905, (2003), 4 pgs.
Lowe, David G, et al., "Object recognition from local scale-invariant features", The Proceedings of the Seventh IEEE International Conference on Computer Vision, 1999, vol. 2. Retrieved at <http:/lwww.cs.ubc.ca/lowe/papers/iccv99.pdf>, (1999), 1150-1157.
Mohammadi, Pedram, et al., "Subjective and Objective Quality Assessment of Image: A Survey", Majlesi Journal of Electrical Engineering, vol. 9, No. 1, (Mar. 2015), 55-83.
Ofili, Chika, et al., "An In-Depth Analysis and Image Quality Assessment of an Exponent-Based Tone Mapping Algorithm", International Journal Information Models and Analyses, vol. 1, (2012), 236-250.
Pham, Tien, et al., "Intelligence, Surveillance, and Reconnaissance Fusion for Coalition Operations", 11th International Conference on Information Fusion, (2008), 1154-1161.
Rodrigues, "About the ZPG-2N Anti-Submarine Blimp", [Online]. Retrieved from the Internet: <URL: http://battleblimps.com/wargames. html>, (Accessed Apr. 1, 2015), 3 pgs.
Samra, Abo, et al., "Localization of License Plate Number Using Dynamic Image Processing Techniques and Genetic Algorithms", IEEE Transactions on Evolutionary Computation, vol. 18, No. 2, (Apr. 2014), 244-257.
Suja, T, et al., "Fusion Based Object Detection", National Conference on Communications (NCC) IEEE., (2010), 3 pgs.

(56) References Cited

OTHER PUBLICATIONS

Viola, Paul, et al., "Rapid Object Detection using a Boosted Cascade of Simple Features", IEEE Conference on Computer Vision and Pattern Recognition (CVPR), (2001), 511-518.

* cited by examiner

OBJECT RECOGNITION AND DETECTION USING REINFORCEMENT LEARNING

RELATED APPLICATION

This application claims the benefit of priority to U.S. Provisional Patent Application Ser. No. 62/911,613 filed on Oct. 7, 2019 and titled "Object Recognition and Detection and Enhancement Using Reinforcement Learning Yield", the contents of which are incorporated by reference herein in their entirety.

TECHNICAL FIELD

Embodiments regard object detection and/or recognition. Embodiments provide techniques, devices, methods, and computer-readable media (CRM) that can use reinforcement learning to determine a chain of techniques suitable for object detection and/or recognition. Embodiments can further implement the determined techniques to perform object detection and/or recognition.

BACKGROUND

Traditional approaches for object detection and recognition are not adaptive to changing conditions, do not support timely decision making, and are not cost effective with respect to consumption of processing resource bandwidth and time. Although traditional approaches can use advanced satellite, radar, and intelligence surveillance and reconnaissance (ISR) capabilities to collect and then fuse mission data, traditional approaches suffer from at least the following drawbacks: limited search time, positioning dependencies, significant cost with respect to processing, and limited ability to adapt to unexpected events.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
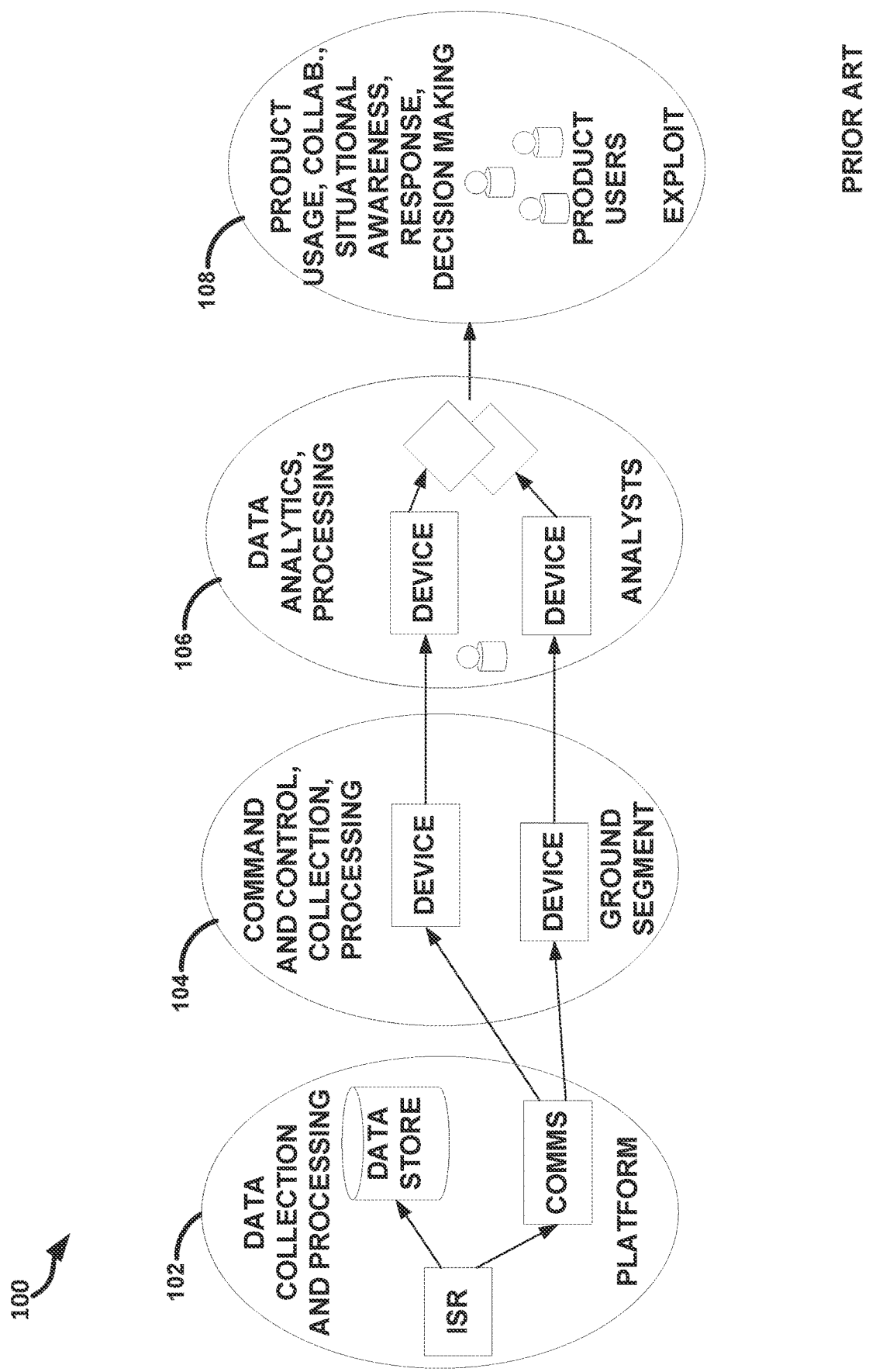
FIG. 1 illustrates, by way of example, a diagram of an embodiment of a traditional ISR data flow.

FIG. 1 illustrates, by way of example, a diagram of an embodiment of a traditional ISR data flow 100. As shown in FIG. 1, the process flow 100 includes four primary segments: ISR data collection platform 102, ground segment 104, analyst 106, and exploitation 108. This flow requires data to be first collected (and sometimes stored) on the sensor platform 102 (e.g., satellite, unmanned or manned aerial vehicle, or the like) and then transmitted elsewhere for quality screening (e.g., ground-based operation center or ground segment 104). Acceptable images are then passed to analysis 106 for the actual processing (e.g., via compression and ground-based screening algorithms) prior to exploiting and disseminating the mission-relevant information to end-users via exploitation 108. As discussed in the Background, issues with these approaches include limited search time, large amount of time between data collection and exploitation, ISR positioning dependencies, and significant cost with respect to human and compute resource bandwidth and time.

One result of advances in sensor observation and collection technology is the emerging problem of data overload. Advancements in sensor observation and collection technology, coupled with the use of multiple sensors distributed among multiple transport platforms that support one or more missions, create the potentially crippling problem of data overload for operators (e.g., Department of Defense, satellite operators, or other entities that process such data) and imagery and video analysts. These personnel depend on that data (e.g., ISR data) to perform time-critical mission functions, such as target engagement. However, operators and analysts are struggling to sift through a massive amount of ISR data collected, to glean relevant information in a timely manner. The present approach to accomplish this wastes much time and hampers the ability to fulfill mission objectives. Contributing to this problem is a limited number of trained personnel and a lack of processing capacity that together result in reduced response time and the potential loss of critical information. As the labor drives up costs and budgets are scrutinized, people seek a solution to this problem that will reduce the vast amount of ISR data to actionable TSR information, yielding both staffing and processing efficiencies.

One well-known example that highlights the need for a solution to this problem occurred on May 8, 2014, when a Malaysian Boeing 777-200ER jet, traveling from Kuala Lumpur to Beijing, China, disappeared shortly after takeoff. A massive search was conducted by multiple countries (using their most advanced satellite, radar, and ISR technologies) over thousands of square kilometers of water and land. However, it took over six months before any trace of this jet was found.

The Department of Defense (DoD), and other entities, seek a solution that will reduce a vast amount of Intelligence, Surveillance, and Reconnaissance (ISR) data to actionable information with the additional benefit of staff capacity improvements, such as a reduction in an amount of personnel required to conduct a mission. Previously, a System of Systems (SoS) to autonomously screen massive collections of sensor data from multiple and diverse data sources was provided in U.S. patent application Ser. No. 14/809,352 titled "System and Method for Global Object Recognition" and filed on Jul. 27, 2015, which is incorporated by reference herein in its entirety. The screening can transform raw data (e.g., image data and/or other sensor information) into actionable information. Analysts 106 can use this information to locate objects in arbitrary geographic locations in a timely manner. Object Recognition and Detection Enhancement via Reinforcement Learning Yield (ORDERLY), sometimes called embodiments, can enhance the SoS by adopting a Reinforcement Learning (RL) technique in identifying a chain of the object recognition/detection algorithms that yields more timely results, thereby enabling response to near-real-time events.

Embodiments can apply a Reinforcement Learning (RL) technique to improve the object detection/recognition techniques, such as those of MAJOR (embodiments disclosed in U.S. patent application Ser. No. 14/809,352). RL is a Machine Learning (ML) technology that enhances intelligence functionality for some applications, such as image classification and recognition. ML imparts self-learning logic in the system to enable a sort of instinctive adaptation to future changes. RL is an unsupervised MT approach that uses agents (e.g., processing nodes) to learn by interacting with the environment to provide a reward (e.g., feedback) signal as the data required for improving accuracy. Agents learn by doing (e.g., by trial and error). Agents can try to complete an activity using several actions, with the outcome from each try determining the best way to fulfill the task. Thus, the agent will learn to take the best actions that maximize its long-term rewards by using its own experience.

As previously discussed, MAJOR provides a unique approach to central processing unit (CPU)/graphics processing unit (GPU) image processing, algorithm chaining, and application of stochastic probabilities to provide confidence intervals for detected image results. Embodiments overcome the shortcomings of these prior approaches and enhances MAJOR by using RL agents (e.g., processing nodes) to learn by interacting with the environment (e.g., images to be processed) with reward ("feedback") to yield correct and timely object recognition and detection.

A key requirement for mission critical systems for search and rescue is that they have the capability to provide timely identification and geo-location of objects within vast geographic areas. Embodiments can benefit from quickly funneling data into the location and recognition information that meets this requirement. Embodiments can achieve this goal by reducing the time from image ingestion to actionable intelligence using one or more of (1) parallel processing for data analysis via distributed nodes, (2) iterative analysis to narrow search area to most probable regions (3) algorithm chaining to concatenate the most relevant algorithms based on algorithm metadata, or (4) feedback to learn from prior experience. Rather than applying only pattern matching algorithms to screen the data sets, embodiments can implement an iterative analysis process.

Figure 2:
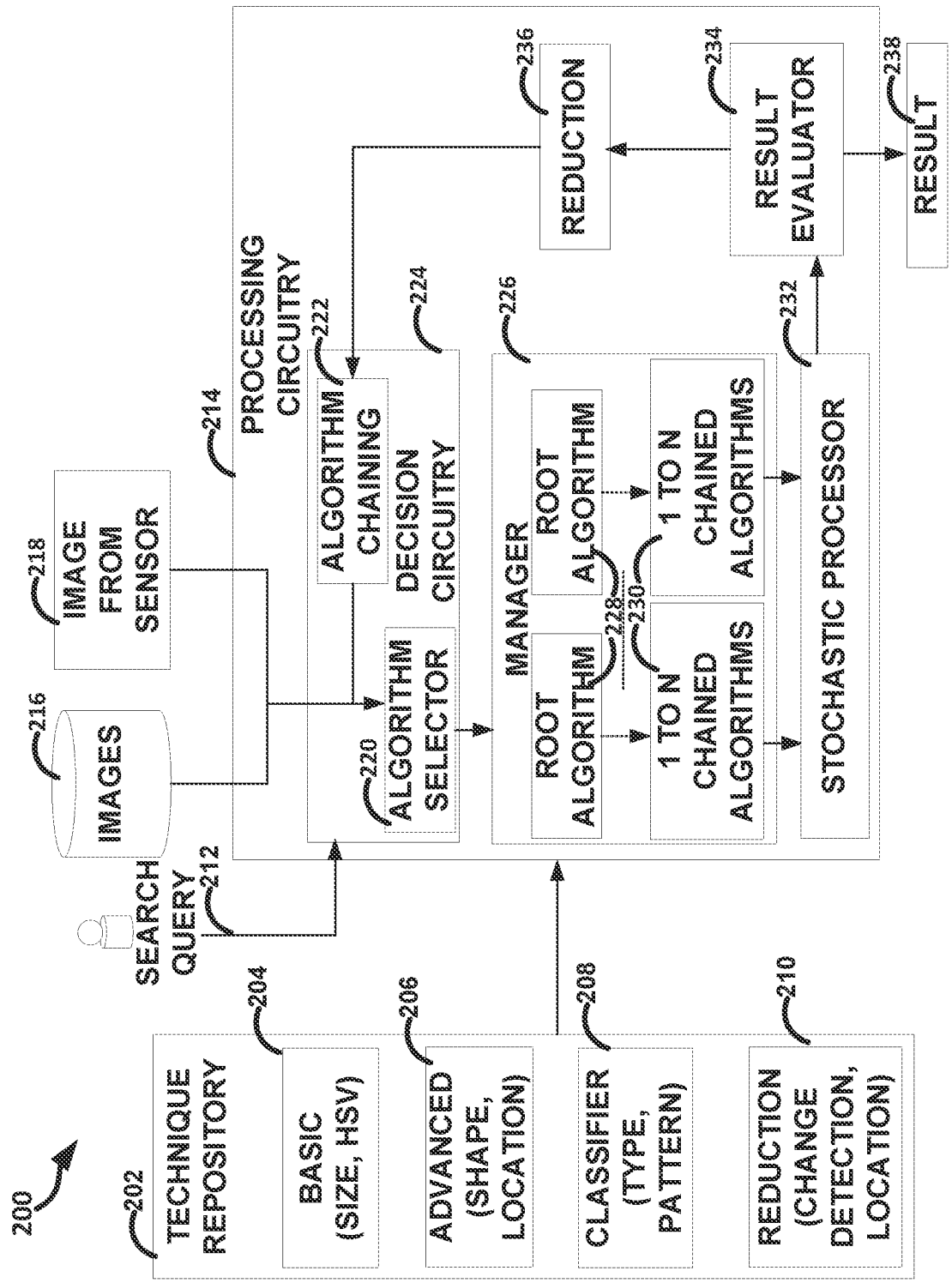
FIG. 2 illustrates, by way of example, a logical block diagram of an embodiment of a system for object detection, recognition, or targeting.

FIG. 2 illustrates, by way of example, a logical block diagram of an embodiment of a system 200 for object detection, recognition, or targeting. The system 200 as illustrated includes a technique repository 202 coupled to processing circuitry 214. The processing circuitry 214 receives a search query 212 and operates on images from an image database 216 and sensors 218 to return one or more images as a result 238.

The technique repository 202 can include image analysis techniques grouped (e.g., indexed) by technique complexity and/or application. For example, the technique repository 202 includes basic techniques 204, advanced techniques 206, classifiers 208, and reduction techniques 210. The basic techniques 204 can consume fewer compute resources bandwidth and time as compared to the advanced techniques 206, classifier techniques 208, and the reduction techniques 210. The basic techniques 204 can, for example, separate images by geography type (land, water, air, a combination thereof, or the like), separate images by hue, saturation value (HSV), or other simpler tasks. The basic techniques 204 are typically used to operate on the images first, such as to reduce the number of images to be operated on by a next technique (if there is a next technique to be used to provide the result 238).

The advanced techniques 206 are image analysis tasks that consume more compute resources or time than the basic techniques 204. Advanced techniques 206 can include shape detection (e.g., silhouette or bounding box of a car, truck, plane, boat, or other vehicle, person, building, road, or other object), determine a location (e.g., (latitude, longitude, height) associated with an image, Universal Transverse Mercator (UTM), global positioning system (GPS), or the like), or other more time or resource intensive techniques.

The classifier techniques 208 are typically machine learning (ML) type techniques that categorize a detected object based on features of the object. The classifier techniques 208 can determine a more specific categorization for an object than shape. Example classifications include facial recognition, type of vehicle, license plate and/or letters or numbers thereof, type of person or animal, an action being performed, among many others.

The reduction techniques 210 are ways of filtering through images to identify those images that are most relevant or information bearing. The reduction techniques 210 can include change detection, such as to determine whether one or more pixels of an image are different between sequential images of a same geographical region, location on the Earth, such as on land or water, in air, or the like, or other image filtering technique.

The processing circuitry 214, as previously discussed, receives the search query 212. The search query 212 indicates features of interest to a user. The processing circuitry 214 is tasked with returning one or more images (the result 238 if there is one) that include the features of the search query 212. The search query 212 can be, for example, "red car, license plate XXXXXX, Tehran". The processing circuitry 214 can parse the query 212 and match features of the query 212 to corresponding techniques of the technique repository 202. The processing circuitry 214 can use images from the images database 216 or from a sensor 218 as input to the techniques.

The images of the image database 216 can be indexed by geographic location, time captured, device that captured the image, or the like. The sensor 218 that captured the image can include a radar, a visible image sensor, an infrared sensor, a multi-spectral image sensor, a sonar, a LIDAR, or the like.

The processing circuitry 214 can implement reinforcement learning (RL) to determine respective chains of techniques suitable for different queries. For example, a query like the one discussed above "red car, license plate XXXXXX, Tehran" can be better executed with a different chain of techniques than a query for "airplane with missiles".

The processing circuitry 214 can include decision circuitry 224, manager circuitry 226. The processing circuitry 214 can implement a stochastic processor 232, a result evaluator 234, and perform a reduction operation 236. The decision circuitry 224 can perform an algorithm chaining operation 222 and an algorithm selector operation 220. The algorithm chaining operation 222 uses RL to determine algorithms to chain together for certain query types. The chaining operation 222 can alter which algorithms are chained together to determine the result 238.

The algorithm selector operation 220 determines, based on the query 212, which of the algorithm chains to implement to determine the result 238. The algorithm selector operation 220 can determine, using parts of language, an ML technique, or the like, which of the algorithm chains to select. For example, the algorithm selector operation 220 can determine that the query wants only images of a location based on a query of "Tehran Harbor" as the query identifies only a location. The algorithm selector operation 220 can then indicate to the manager circuitry 226 which algorithm to use to identify images of the location. In another example, the query 212 can include "USS Jefferson". The algorithm selector operation 220 can have a chain that is well-suited for identifying ships and indicate the chain that is well-suited to identify ships (such as by index of the chain) to the manager circuitry 226.

Figure 3:
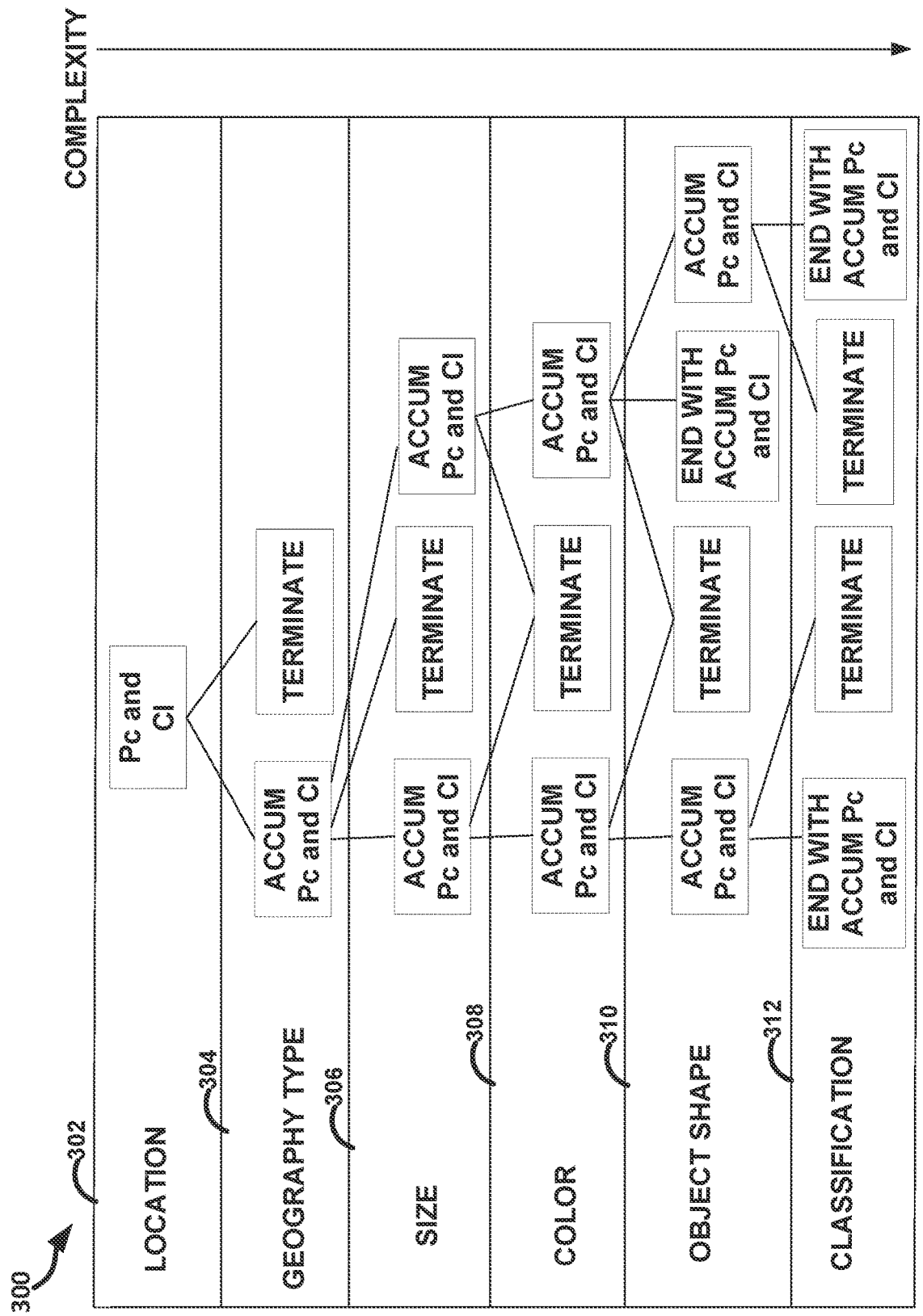
FIG. 3 illustrates, by way of example, a diagram of an embodiment of a chain of techniques for object detection/recognition or image culling.

With reference to FIG. 3, in such a ship-identification chain, the location 302 technique can operate based on one or more known locations of the ship, the geography 304 technique can operate to identify water images in the images returned by the location 302 technique, and the size 306 technique can operate to identify ships or an object with a size of a ship that sufficiently matches the ship in the images returned by the geography type 304 technique. Additionally, the color 308 technique can operate to identify a color of the ship in the images returned by the object shape 306 technique, the object shape technique 310 can operate to identify images that include objects of the shape of the ship in the images returned by the color 308 technique or the object size 306 technique, and/or the classification technique 312 can operate to identify images that include objects of a specified classified classification in the images returned by a previously executed technique in the chain.

Referring back to FIG. 2, the manager circuitry 226 organizes algorithms implemented by the chains, manages results (images) returned by, and operated on, by the algorithms, and initiates execution of the algorithms. The algorithms 228, 230 illustrate examples of chains of algorithms.

The stochastic processor 232 determines Probability of Correctness (Pc) and the associated Confidence Interval (CI) for the results 238. The stochastic processor 232 can implement a stochastic math model (SMM), such as one similar to that shown in FIG. 3. In the SMM, a subject matter expert (SME) can determine, based on experience, empirical evidence, or the like, Pc and Ci for a given algorithm. The empirical evidence can include determining an accuracy of the algorithm based on a ground truth algorithm. The ground truth algorithm can be computationally and/or memory intensive relative to an algorithm in the algorithm chain. However, the ground truth algorithm can be more accurate than the algorithm in the algorithm chain. The SMF can operate the algorithm in the algorithm chain for a variety of images that fit a scenario of a query. The results of the algorithm operation can be compared to results produced by the ground truth algorithm for the same images. A comparison of the results can provide Pc and Ci for the algorithm operation in the scenario. This process can be performed before implementation of the algorithm chaining and (in the background) while the algorithm chaining operates. The stochastic processor 232 can generate an accumulated Pc and Ci for the algorithms operated as the algorithm chaining operates. This accumulated Pc and Ci is the combination of Pc and Ci from all algorithms operated thus far, including this algorithm. The stochastic processor 232 can thus determine respective Pc and Ci for each scenario and each algorithm used in the algorithm chaining. The result can be a table or matrix of scenarios, associated algorithms, and the Pc and Ci associated with the algorithm operation in the scenario. The algorithm with an associated highest Pc for the scenario can be the algorithm called by the manager circuitry 226 to perform the analysis for the scenario.

During the training phase, multiple different chains of algorithms can be running concurrently. Initially, it is not known what is the best algorithm chain for a given image characteristic. With the training data set, the best algorithm chain for a given scenario can be identified according to the accumulated Pc and CI. Then, during runtime, the identified best algorithm chain can be selected if the image query includes a characteristic that the chain operates well (best) to identify.

The result evaluator operation 234 can determine whether the accumulate Pc and Ci for the result are within corresponding threshold limits. The Pc can be required to be greater than a specified probability (e.g., greater than 0.5, 0.55, 0.60, 0.65, 0.70, 0.75, 0.80, 0.85, 0.90, 0.95, 0.975, a greater or lesser probability, or a probability therebetween). The Ci can be required to be less than a specified percentage of the probability (e.g., +/−1%, +/−2%, +/−3%, +/−4%, +/−5%, +/−10%, +/−15%, +/−20%, +/−25%, a greater or lesser percentage or a percentage therebetween).

The result evaluator operation 234 can determine a reward for RL. The result evaluator operation 234 can provide the result 238 to a user in response to determining the reward is sufficient. More discussion regarding the reward is provided elsewhere herein.

The reduction operation 236 can reduce the search space to only images 216, 218 associated with Pc and Ci that meet the threshold requirements. Those images returned by the reduction operation 236 can then be the only images operated on by the next algorithm in the algorithm chain.

Circuitry, such as the processing circuitry 214, decision circuitry 224, manager circuitry 226, or other circuitry can include one or more electric or electronic components configured to perform operations of the circuitry. The electric or electronic components can include one or more transistors, resistors, inductors, capacitors, diodes, logic gates (e.g., AND, OR, XOR, negate, buffer, or the like), power supplies, memories, switches, amplifiers, processing units (e.g., CPUs, GPUs, field programmable gate arrays (FPGAs), application specific integrated circuits (ASICs), or the like), clocks (e.g., oscillators or the like), a combination thereof, or the like.

Embodiments provide a meta-technique to enhance the application of the use of the SoS of the U.S. patent application Ser. No. 14/809,352 to detect and classify objects of interest. Embodiments make use of the product of RL (e.g., a policy that RL has produced during training). This policy, as determined by the decision circuitry 222 and based on the operational results of the stochastic processor 232 can be used operationally by the manager circuitry 226 to alter or generate a chain of algorithms to determine a result for the query 212. The policy can be based on (e.g., only) the current operation state of the system 200, such as to determine a next state for the system 200.

As previously discussed, traditional approaches for object recognition/detection use advanced satellite, radar, and ISR capabilities to collect and then fuse data and have significant drawbacks, such as having a limited search time, being in the right area at right time, adding significant cost with respect to cost and processing, and not providing timely data collection and analysis. "Big Data" companies, such as Google®, do not have a solution for optimally selecting algorithms to find arbitrary objects. Previous algorithm and processing work with respect to object search and detection is focused on use of GPUs for object recognition, scrubbing probabilistic databases, developing smart object recognition algorithms, and fusion of global and local information for pattern recognition and object detection.

Embodiments provide a unique approach to CPU/GPU image processing, algorithm chaining, and application of stochastic probabilities to provide confidence intervals and probability for detected image results. Embodiments provide a meta-technique and system that applies RL policy operationally to achieve adaptive and timely object recognition and detection. Embodiments provide a novel way to apply RL to develop adaptive decision policies for selecting algorithms to support object recognition/detection (and other object identification tasks such as classification).

Embodiments provide a new RL model that defines state space, action space, reward function, and Q-learning process. Embodiments can select and apply multiple, concatenated object recognition/detection algorithms. Embodiments can derive and validate overall chained-algorithm correctness with an associated confidence interval. Embodiments provide implementation of data that improves high performance processing, Embodiments can help select a chain of algorithms best suited for state observability based on a specified sensor. In sum, embodiments provide a meta-technique that applies RL policy operationally to enhance the application of the algorithms used to detect and classify objects of interest The operation of the system 200 can include an iterative analysis using techniques to detect and classify the objects of interest; thereby narrowing the search area to most probable regions. The technique can include chaining to concatenate the most relevant algorithms based on technique metadata. The technique can be implemented using parallel processing for efficient data analysis via distributed nodes.

FIG. 2 illustrates, by way of example, a diagram of an embodiment of a processing architecture to implement the iterative analysis process. This process enables embodiments to detect objects of interest using appropriate techniques to narrow search area to most probable regions. To do so, embodiments can segment the screening process into multiple levels and assign Measures of Effectiveness (e.g., metrics) to each level. Example metrics include size, color, number of pixels, land or water, longitude/latitude, shape, and image classification. Then, embodiments intelligently select screening techniques according to the assigned metric at each level. Technique chaining can improve the image processing time because it filters out extraneous data, such as unlikely images and areas, at the early stages of the recognition and detection process. For example, to detect a black ship in images, instead of using simply a pattern-matching algorithm to screen the entire image, embodiments can initially select water/land determination and color matching algorithms to eliminate images that lack the objects of interest.

To provide confidence in analysis results, embodiments use a Stochastic Math Model (SMM) to compute Probability of Correctness (Pc) and the associated Confidence Interval (Ci) with respect to whether or not a technique correctly recognizes that an image contains the objects of interest. FIG. 3 illustrates, by way of example, a diagram of an embodiment of an SMM structure, which consists of hierarchical levels corresponding increasing levels of fidelity in the technique chain. Optionally, embodiments can leverage feedback to support dynamic update of object recognition and detection accuracy. For this option, embodiments can compare a reference technique Pc and CI results with those for techniques in the present technique chain at each level and then selects those techniques with the highest Pc and CI.

FIG. 3 illustrates, by way of example, a diagram of an embodiment of a chain of techniques 300 for object detection/recognition or image culling. The techniques 300 are ordered to logically solve a problem using a chain of algorithms. The problem typically can be solved using a single, more complex algorithm. Complexity can be in terms of compute resources required, instructions executed, time for operation, memory consumed, a combination thereof, or the like. The types of techniques in complexity order (from simplest to most complex) are location 302, geography type 304, size 306, color 308, object shape 310, and classification 312.

The location 302 can be in the form of latitude and longitude, Universal Transverse Mercator (UTM), geographical positioning system (GPS), or the like. Examples of location 302 techniques can include a geo-accuracy service that improves a geolocation accuracy of imagery with lower accuracy or no RPC (Rational Polynomial Coefficient) data. Imagery with high accuracy RPC will not benefit from such a location technique 302 algorithm. The service creates a mosaic of Controlled Image Base 1-meter (CIB01) data to register the image against.

The geography type 304 can include land, water, air, or a more specific geography type, such as mountain, lake, river, road, valley, or the like. Examples of geography type 304 techniques include Hue Saturation Value (HSV) to distinguish land from water, brown indicates land and green indicates water. For determining more terrain-like features, DTED (or Digital Terrain Elevation Data) is a standard of digital datasets which consists of a matrix of terrain elevation values (a Digital Elevation Model).

The object shape 306 can include a general object shape, such as square, rectangle, triangle, or the like or can include a more specific object shape, such as truck, boat, ship, airplane, drone, helicopter, person, animal (or type of animal), car, motorcycle, semi, trailer, building, house, tree, shrub, or other object shape. Examples of object size 306 techniques include techniques to separate images with a large number of pixels from images with few pixels or phase-measuring deflectometry.

The color 308 can include a varied specificity. For example, the color can include a standard rainbow or prism of colors, such as red, orange, yellow, green, blue, indigo, violet, or a more specific definition of the colors, such as can be indicated by a frequency of visible or non-visible radiation (specified in terms of Hertz, for example). Examples of color 308 techniques include the previously discussed HSV technique, a platinum-cobalt method, a tristimulus method, or the like.

The size 310 can include a varied specificity. For example, the size can include small, medium, or large, or a more specific definition of the size, such as a variety of ranges of sizes of one meter, two meters, five meters, ten meters, twenty meters, twenty-five meters, fifty meters, one hundred meters, a smaller or larger range of sizes, or the like. Examples of shape 310 techniques include a Road. Detection Technique that can create a shapefile representing the roads and major pathways in an image. This technique uses a feature-based classifier to determine roadways. The output product is a shapefile that can be overlaid on the image to highlight the roads. A Ship Detection Technique uses statistical measures to locate ships in open ocean and littoral imagery. A 'tipsheet' summary of the detections and a shapefile are created as the final product. Another example technique includes determining a ratio that measures a number of pixels per a given metric.

The classification techniques 312 can determine a class for which an object is a member. The classification technique 312 can be implemented using a heuristic-based technique, neural network (NN), or another machine learning technique. The classification technique 312 can include a random forest classifier, a recurrent or convolutional neural network, a Bayesian network, support vector machine (SVM), kernel-based techniques, logistic regression, k-means clustering (or other clustering technique), or the like.

Figure 4:
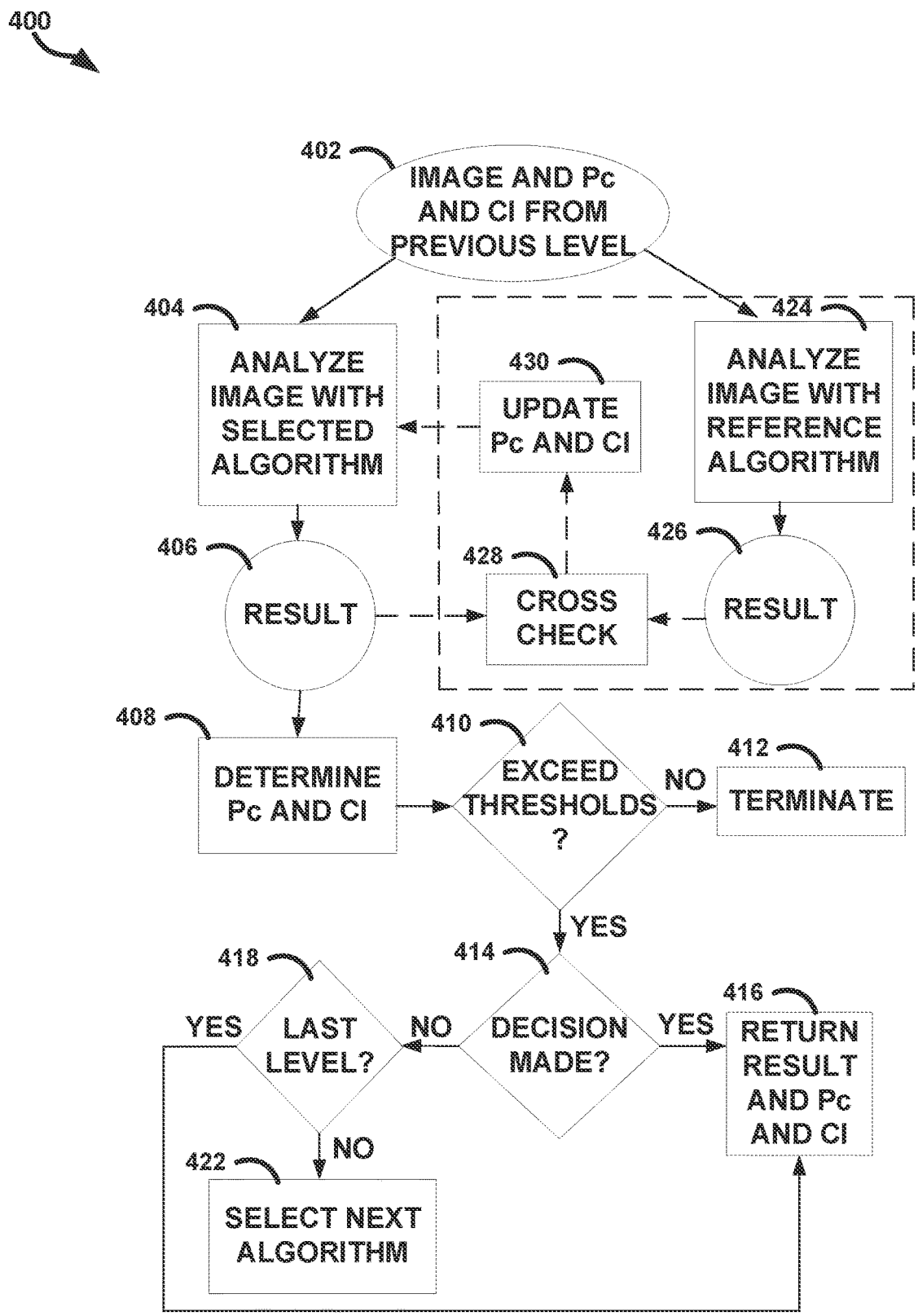
FIG. 4 illustrates, by way of example, a flow diagram of an embodiment of a technique for algorithm chaining operation using RL.

FIG. 4 illustrates, by way of example, a flow diagram of an embodiment of a technique 400 for algorithm chaining operation using RL. The technique 400 as illustrated includes, at operation 402, receiving or retrieving an image and an associated Pc and CI. If this algorithm is the root algorithm 228, the image can be from the images database 216 or from the sensor 218. If this algorithm is the algorithm 230, the image can be one that includes a Pc and CI from an immediately previous algorithm. At operation 404, the algorithm can analyze the image and generate a result 406. The result 406 includes an image and an indication as to whether the image includes a condition required by the query 212. At operation 408, the accumulated Pc and CI for the result 406 can be determined, such as by the stochastic processor 232. The Pc and Ci can be based on the algorithm operation and the Pc and CI from the previous level. The Pc of the result from the current algorithm can be combined with the Pc associated with the result of the algorithm of the immediately previous level to generate the Pc for the current level. The CI from the previous level can be combined with the CI associated with the result of the algorithm of the immediately previous level to generate the CI for the current level. The combination of Pcs and CIs can include statistical methods known to combine conditional probabilities.

At operation 410, it can be determined whether the Pc and CI exceed thresholds. If the Pc is greater than a minimum probability and the CI is less than a specified percentage, then the technique 400 continues at operation 414. If either the Pc is less than the minimum probability or the CI is greater than the specified percentage, the technique 400 terminates at operation 412. The operation 412 means that the image is not considered by an algorithm further down the chain of algorithms and a next image (if there is one) is analyzed by the algorithm.

At operation 414, it is determined whether the query 212 is satisfied by the analysis of the image. If the query 212 is satisfied, the image and associated Pc and CI are returned as the result, at operation 416. If the query 212 is not satisfied, it can be determined whether the current algorithm is part of the last level of the current chain of algorithms, at operation 418. If the algorithm is the last algorithm in the chain, the operation 416 can be performed. If the algorithm is not the last algorithm in the chain, the next algorithm in the chain can operate on the image, at operation 422.

The operations 404, 408, 410, 412, 414, 416, 418, 422 can be performed online or during runtime. The operations 424, 426, 428, and 430 can be performed offline. The operation 424 is similar to the operation 404 but using a reference algorithm that is known to have better accuracy, precision, or a combination thereof than that of the current algorithm in the algorithm chain to generate a result 426. At operation 428, the result 406 from the current algorithm is compared to the result 426 from the reference algorithm. If the result 406 is the same as the result 426, the Pc for the current algorithm in analyzing for the scenario can be adjusted accordingly. If the result 406 is the same as the result 426, the CI for the current algorithm in analyzing for the scenario can be adjusted accordingly. If the result 406 is different from the result 426, the Pc for the algorithm in analyzing for this scenario can be adjusted accordingly. If the result 406 is different from the result 426, the CI for the algorithm in analyzing for this scenario can be adjusted accordingly.

Training the decision circuitry 224 and the manager circuitry 226 can include leveraging feedback using the reward signal and random trial and error algorithm selection to train the system to produce a policy. Embodiments can use the operation and training of the technique to enhance the techniques used to detect and classify objects of interest. The operational process can include using SMM to support trust in results. Embodiments can compute a probability of correctness (Pc) and confidence interval (CI) with respect to successfully determining whether an image contains the object(s) of interest. Object recognition and detection techniques can be combined hierarchically, by embodiments, through a chaining scheme. Each level of the hierarchy can correspond to one or more techniques that are simpler subtasks of a more complex task.

A training for a foreground policy can be done offline and ahead of time. The policy can be used during operation of the technique. A new policy can be continually trained/developed with background processing, such that it does not influence foreground processing unless a commander decides to swap to the new policy. The new policy may be superior because it has had the advantage of continual training.

Results of embodiments can be combined hierarchically through a chaining scheme that incorporates feedback to produce a policy that is continuously trained. The basic model of embodiments can be simple and computationally tractable with a two-valued state space. An alternative RL of embodiments can define a state space in terms of a finite number of concentric semi-circle regions in the upper (1-Pc, CI) half-plane, given that P and CI are always positive. This is described in further detail regarding FIG. 5.

Figure 5:
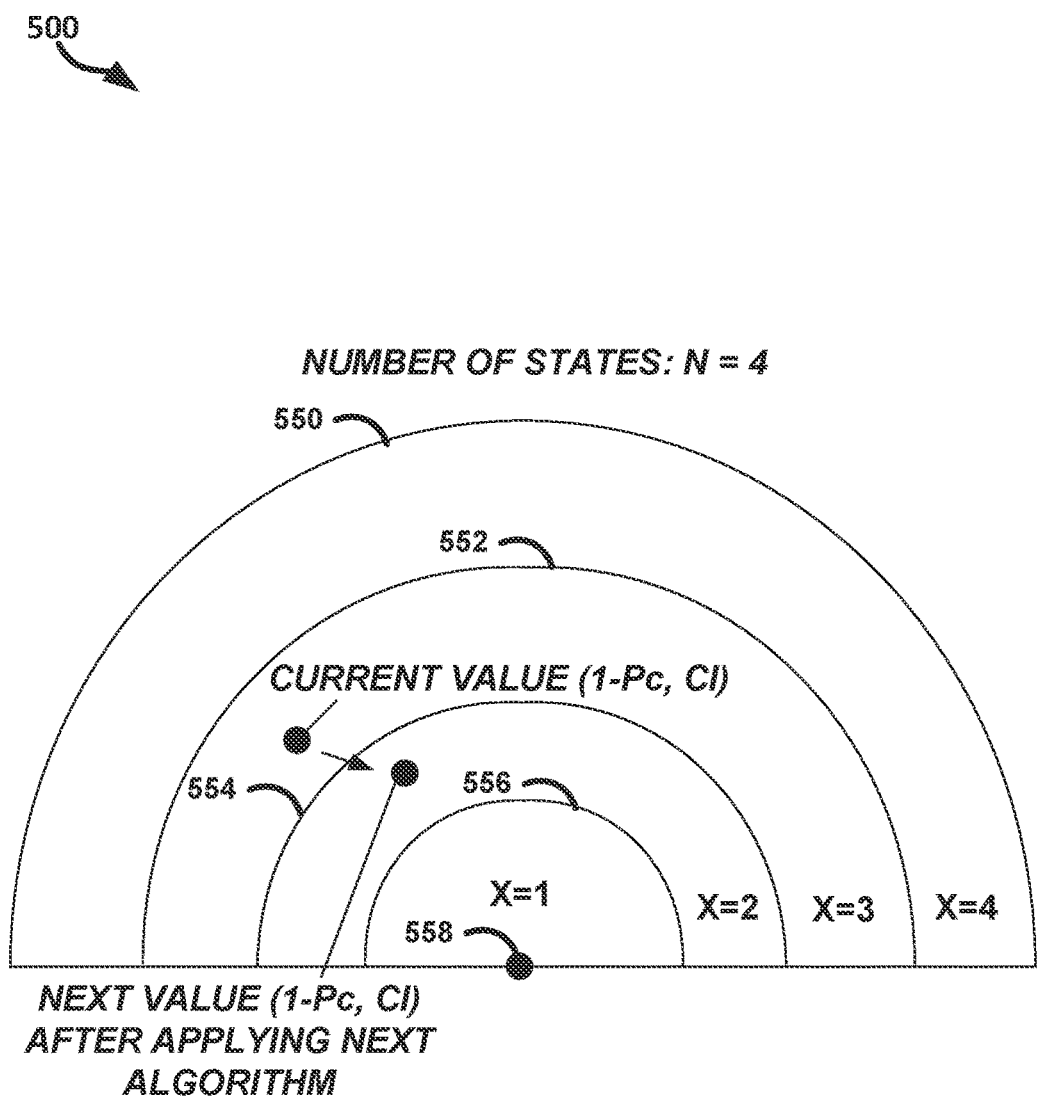
FIG. 5 illustrates, by way of example, a diagram of an embodiment of an RL model of algorithm chaining.

To illustrate the basic, two-valued RL state model of embodiments described above, consider the process shown in FIG. 4. Initially, SIMM processor 232 can use a training dataset (e.g., evenly distributed samples) to evaluate individual techniques (sometimes called algorithms) in the library. At runtime, for a given image or set of images, an accumulated Pc and CI for the chosen screening technique(s) at each level in the hierarchy can be computed. Embodiments assess these results with respect to whether or not Pc has attained the desired value (e.g., accuracy threshold) with an acceptable CI (e.g., +/−5%), If not, then the screening process terminates at the present level, and embodiments can void the current search path. If yes, then embodiments can determine whether or not it reaches a conclusion at the present level. If yes, then the process can terminate and embodiments can yield the results to the end users. If not, then embodiments pass the accumulated results to the next level of the hierarchy, consults the learned optimal policy to choose the next technique to try, and the process continues. This iterative analysis narrows the object search at each level until the conclusion is reached or the search ends. If the (Pc,CI) threshold is not met at the lowest level, then the best result is yielded FIG. 5 illustrates, by way of example, a diagram of an embodiment of an RI, model 500 of algorithm chaining. The RL model 500 can be described as a state space of concentric rings 550, 552, 554, 556. Let state space $X=\{x_1, \ldots, x_N\}$ be defined in terms of the N concentric rings 550, 552, 554, 556 of (1-Pc,CI) values centered about a point 558 (e.g., (0,0)) using a weighted Euclidean distance metric. The state corresponding to the innermost ring 556 is defined as the desired terminal state. An action space can be all possible choices of algorithms designed to classify the object and which will reduce the values of 1-Pc and CI (assumed for simplicity to be a same set for all possible states).

A reward function for the RL model 500 can be a difference between a terminal threshold radius and outer radius of a current state determined by a norm of a current (1-Pc, CI) pair. This reward is a negative number when the state is outside the terminal threshold radius (the innermost ring 556) and positive when inside the innermost ring 556.

A learning process can involve implicitly learning state transition probabilities and explicitly learning an optimal Q function (and hence optimal policy) for every state-action pair, such as in a standard Q-learning manner. A basic RL model of embodiments is a special case of a larger one with state space of size N. Determining practical values for N is dependent on computational resources available and action space size and can be accomplished using simulation.

In order to respond to dynamic changes in mission objectives, e.g., changes in the types of objects to be recognized and detected, embodiments can use RL, an independent, self-teaching system. RL enables the manager circuitry, decision circuitry, or the like (e.g., a processing node) to learn by interacting with its environment (e.g., images to be processed) and provides a reward ("feedback") signal. Agents learn by doing, hence learn by trial and error. The most basic RIL model, which is more specific than the general RL model just discussed, can be defined as follows:

State Space: Two state values: 1-Pc and CI below threshold or not; Actions: All possible choices of algorithms designed to classify the object and which will reduce the values of 1-Pc and CI; Reward: Difference between a target (1-Pc,CI) threshold and the pair of corresponding (1-Pc, CI) values expected to be obtained after application of each algorithm (a negative number prior to crossing the threshold and positive afterward); a Q-learning process that, through trial and error, learns how each possible algorithm choice decreases or increases the cumulative reward. More details regarding standard Q-learning are provided in R. S. Sutton and A. G. Barto, "Reinforcement Learning: An Introduction (Adaptive Computation and Machine Learning series)", 2nd Edition, A Bradford Book, 2018.

This basic model is simple and computationally tractable with a two-valued state space. An alternative RL can define the state space in terms of a finite number of concentric semi-circle regions in the upper (1-Pc, CI) half-plane; given that P and CI are always positive (see FIG. 5).

Figure 6:
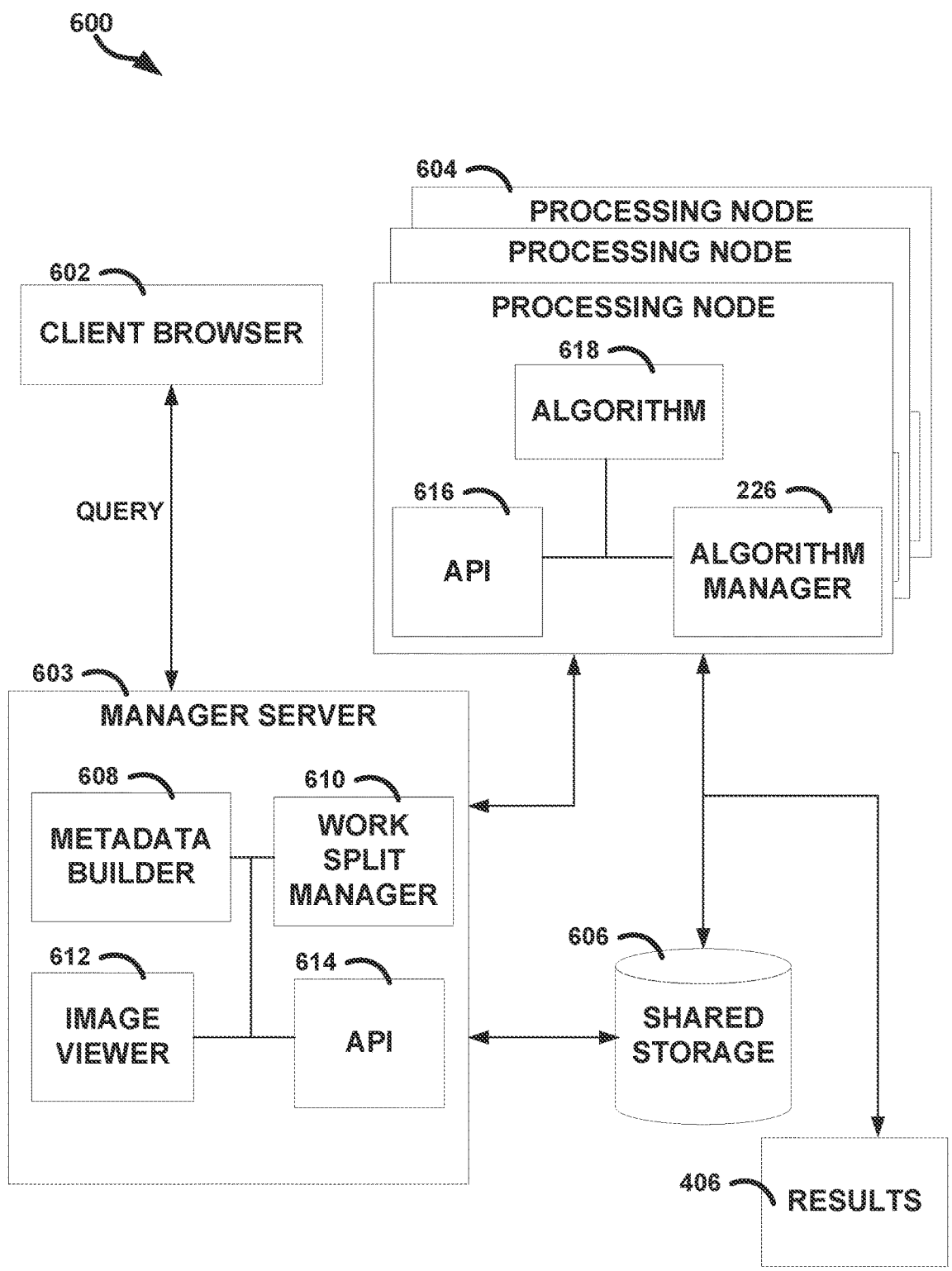
FIG. 6 illustrates, by way of example a system for RE algorithm chaining operation.

FIG. 6 illustrates, by way of example a system 600 for RL algorithm chaining operation. The system 600 as illustrated includes a client browser 602 (accessible through a user interface (UI)), the manager circuitry 226 (such as can be implemented on a server or the like), processing nodes 604, and shared storage 606. The processing nodes 604 can implement the algorithm chain operation to generate the results 406.

The client browser 602, server 603, and processing node 604 provide a mechanism for analysts to interact with a geographic map as well as view analyzed imagery via the image viewer 612. The server 603 can receive incoming images to process, splitting those images into work sets, and then distributing the work sets to all available processing nodes 604. The processing node 604 (of which there can be as many as available hardware) can accept work tasks, run algorithm chains 618 (same as one of the algorithms 228, 230) on the images in a work task, and output analysis results 406.

The manager server 603 can determine metadata for each image portion using the metadata builder 608. The metadata can include a date, time, geographic location, type of image (e.g., color, grayscale, infrared, light detection and ranging (LiDAR), radio detection and ranging (RADAR), multi-spectral, or the like), source platform, or the like.

The work split manager 610 can manage distributed processing of the images using the processing nodes 604. The work split manager 610 can issue work orders indicating an algorithm and an image portion which the algorithm is to operate on.

The image viewer 612 provides an interactive map of Earth's surface or other image viewer. The user can select geographic locations, structures, other object, or the like, that can be detected by the algorithm chaining techniques implemented by the processing nodes 604.

The application programming interface (API) 614, 616 allows the user to interact with the server 603 without having to know the low level details of the manager server 603 and processing nodes 604 operations, respectively. The API 614 can translate a function call into language that is understandable by the processing node 604. The API 616 can translate a function call into language that is understandable by the manager server 603.

The algorithm 618 can include one of the algorithms 228, 230. The algorithm manager circuitry 226 can manage which algorithm is called to operate to generate the result 406.

The shared storage 606 can include algorithm code, libraries, images, or the like required to execute the algorithms 618 on the images. The shared storage 606 can allow a developer to change the algorithm operation for each of the processing nodes 604 in one place without changing algorithm code on all the processing nodes 604 individually.

Training data for embodiments can include a priori accuracy information on techniques for Pc and CI computation during RL training, execution data for scenario (e.g., mission), such as terrain, geographic data, or weather. Embodiments can be recognition detection technique agnostic. A recognition detection technique can include a change detection technique and a characterization technique.

Embodiments provide a novel way to apply RL to develop adaptive decision policies for optimally selecting techniques to support object recognition and detection (and other object identification tasks such as classification). Embodiments can operate using a new RL model that defines a unique state space, action space, reward function, and/or Q-learning process in order to select and apply multiple, concatenated data recognition and detection algorithms in such a way as to derive and validate overall chained-algorithm correctness with an associated confidence interval. Embodiments provide implementation of the intelligence gained such that it improves high performance processing. Embodiments can help select best sensors for state observability. Embodiments can help process and interpret Computation Social Science (CSS) data Embodiments can be used to search for data within social media (using a different technique set), be applied to process and interpret Natural Language Processing data, select sensors for state observability (e.g., electro-optical sensor may not be able to observe objects in cloudy weather), thus embodiments automatically select an infrared (1R) or other sensor, applied to cloud computing since cloud computing has successfully demonstrated the ability to centralize and offload many computing tasks, leverage edge/distributed computing to solve problems in situations where cloud computing is insufficient such as to provide real-time, low-latency control and decisions based on data locally available, systems that have low bandwidth, unreliable, or disconnected networks.

A prototype of the architecture was tested with a set of 940 images from a diverse set of databases to create a blend of Overhead Imagery Research Data Set (MUDS). Most of the images were small 200×200 pixel images, while others were large 14000×16000 pixel images. A first goal of this prototype was to find ships and cars in images, using a simple set of ship detection (SD), anomaly detection, water determination, land determination, and color matching algorithms, and then apply an RL technique to improve the technique selection at each level of the technique chain. The demo structure was modeled using a discrete event simulator to calculate the overall PC and CI, including the CIs for all of the image paths. The Pc values for each of the algorithms used in the demo were incorporated within the model. Using Monte Carlo analysis, the model generated Pc, including the respective CIs per path. These CI results can help verify that technique accuracy was close to that predicted by the SMM with high confidence. These results also identified opportunities to replace less accurate techniques with more accurate techniques using the RL techniques at each level of the chain.

A second goal of embodiments is to reduce the overall processing time on a set of images. As part of prototype testing, metrics were captured that compared processing time of prior techniques (i.e. 282 seconds) with that of one average node of embodiments (i.e., 153 seconds). Time improved with nodes of embodiments because of the lower processing requirements gained by technique chaining. For example, the SD technique takes approximately 59 seconds per image without algorithm chaining. Inserting a 2-second per image filtering technique in front of SD in the algorithm chain saves 57 seconds per image. Additional time reduction occurs once parallelization is introduced because the most processing intensive algorithms can run concurrently instead of sequentially.

TABLE 1 time from image ingestion to actionable intelligence

| Image Size (pixels) | Operation | Time |
| --- | --- | --- |
| Small (<1600×1200) without object of interest | Open image, look for objects, move to success factor | 2 seconds |
| Small (<1600×1200) with object of interest | Open image, look for objects | 13 seconds |
| Large (>10000×10000) with <1% water and no objects | Open image, look for objects | 40 seconds |
| Large (>10000×10000) with ~33% water with objects | Open image, look for objects, take screen shots of objects | 20 minutes |
| Large (>10000×10000) with ~100% water with objects | Open image, look for objects, take screen shots of objects | 60 minutes |

A third goal of embodiments can be to reduce the analyst time from image ingestion to actionable intelligence. An experiment was performed to simulate the actions of an analyst that used simple tools, such as image viewers, terminals, and text editors. The resulting times are shown in Table 1 above. As can be seen from this table, as the complexity of the analyst's task increases from simply opening an image to actually locating these objects and taking screen shots, analyst time increases significantly; thereby providing an opportunity for improvement. Applying the time estimates from Table 1 to the 940-image test set, embodiments resulted in a 33% improvement from image ingestion to actionable intelligence.

Object Recognition and Detection Enhancement via Reinforcement Learning Yield (ORDERLY), sometimes called embodiments or an embodiment, enhances previous object recognition and detection techniques by introducing a Reinforcement Learning (RL) technique that yields timely results moving data from ingestion to actionable intelligence. The RL algorithm provides a feedback approach to improve iterative analysis by using most relevant techniques to narrow object search to most probable regions. The proposed technique helps analysts promptly extract the actionable intelligence without wasting valuable time and resources, for example sifting through thousands of still imagery and video footage while gaining very little useful information. Embodiments enable resource reduction, operator and analysts' productivity increases across the ISR mission segments, and response-time improvements to meet time critical needs of end-users.

Embodiments can be realized using a system comprising a novel application of parallel processing (for data analysis) with distributed nodes. Embodiments can apply RL to identify the most accurate techniques to concatenate with the technique chain and supports these choices using the Stochastic Math Model (SMM) to compute Probability of Correctness (Pc) and Confidence Interval (CI) for each technique in the chain. Results show that embodiments improve time from image ingestion to actionable intelligence by 33% over an analyst doing so using present best-practice techniques. Embodiments can be applied to multi-domain battle management command and control to help analyze mission success with respect to Course of Action development, analysis and comparison.

Figure 7:
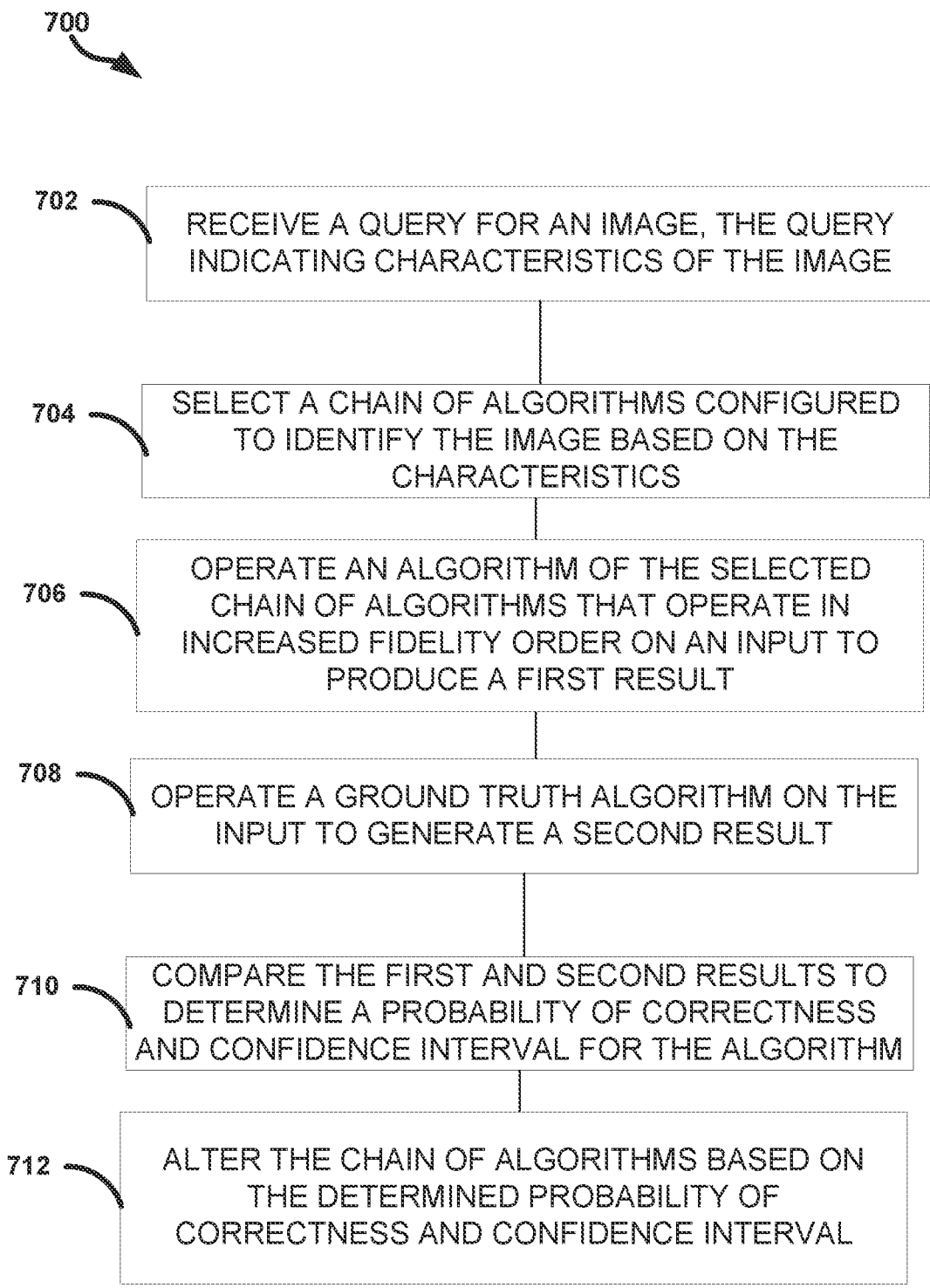
FIG. 7 illustrates, by way of example, a diagram of an embodiment of a method for RL algorithm chaining.

FIG. 7 illustrates, by way of example, a diagram of an embodiment of a method 700 for RL algorithm chaining. The method 700 as illustrated includes receiving a query for an image, the query indicating characteristics of the image, at operation 702; selecting a chain of algorithms configured to identify the image based on the characteristics, at operation 704; operating an algorithm of the selected chain of algorithms that operate in increased fidelity order on an input to produce a first result, at operation 706; operating a ground truth algorithm on the input to generate a second result, at operation 708; comparing the first and second results to determine a probability of correctness (Pc) and confidence interval (CI) for the algorithm, at operation 710; and altering the chain of algorithms based on the determined Pc and CI, at operation 712.

The method 700 can further include selecting the algorithm of immediately next algorithms that maximizes a cumulative reward for the chain of algorithms. The method 700 can further include operating the immediately next algorithm of the chain of algorithms on the input and determining, using reinforcement learning (RL), for each of the remaining algorithms respective rewards for operating using immediate next algorithms of the chain of algorithms.

The method 700 can further include, wherein the reward is defined as a difference between the Pc at the algorithm and a corresponding target Pc. The method 700 can further include, wherein the reward is further defined as a difference between the CI at the algorithm and a corresponding target CI. The method 700 can further include, wherein a state space for the RL is all possible positive values of Pc and CI.

The method 700 can further include, wherein the state space includes concentric rings defining ranges of Pc and CI values for each algorithm in the chain of algorithms and the reward is positive only in an inner most ring of the concentric rings. The method 700 can further include, wherein the reward is a difference between a terminal threshold radius and outer radius of a current state determined by a norm of a current (1-Pc,CI) pair.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (MA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output, Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 8:
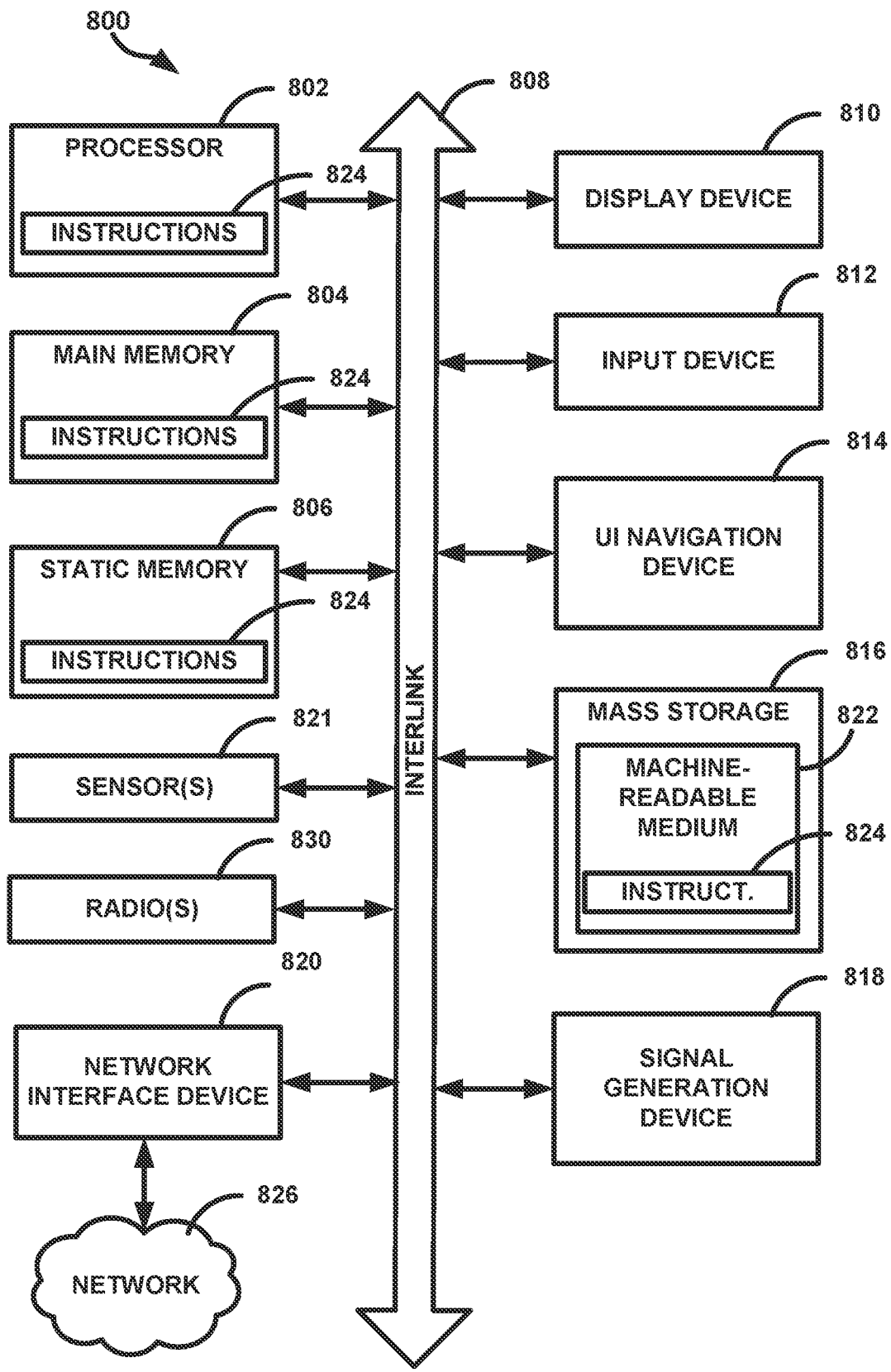
FIG. 8 illustrates, by way of example, a block diagram of an embodiment of a machine in the example form of a computer system within which instructions, for causing the machine to perform any one or more of the methodologies discussed herein, may be executed.

FIG. 8 illustrates, by way of example, a block diagram of an embodiment of a machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker), a network interface device 820, a sensor 821 (e.g., an image sensor), and radios 830 such as Bluetooth, WWAN, WLAN, and NFC, permitting the application of security controls on such protocols.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

The following non-limiting Examples are provided to help a reader understand details of embodiments.

Example 1 includes a method comprising receiving a query for an image, the query indicating characteristics of the image, selecting a chain of algorithms configured to identify the image based on the characteristics, operating an algorithm of the selected chain of algorithms that operate in increased fidelity order on an input to produce a first result, operating a ground truth algorithm on the input to generate a second result, comparing the first and second results to determine a probability of correctness (Pc) and confidence interval (CI) for the algorithm, and altering the chain of algorithms based on the determined Pc and CI.

In Example 2, Example 1 can further include selecting the algorithm of immediately next algorithms that maximizes a cumulative reward for the chain of algorithms, operating the immediately next algorithm of the chain of algorithms on the input and determining, using reinforcement learning (RL), for each of the remaining algorithms respective rewards for operating using immediate next algorithms of the chain of algorithms.

In Example 3, Example 2 can further include, wherein the reward is defined as a difference between the Pc at the algorithm and a corresponding target Pc.

In Example 4, Example 3 can further include, wherein the reward is further defined as a difference between the CI at the algorithm and a corresponding target CI.

In Example 5, at least one of Examples 2-4 can further include, wherein a state space for the RL is all possible positive values of Pc and CI.

In Example 6, Example 5 can further include, wherein the state space includes concentric rings defining ranges of Pc and CI values for each algorithm in the chain of algorithms and the reward is positive only in an inner most ring of the concentric rings.

In Example 7, Example 6 can further include, wherein the reward is a difference between a terminal threshold radius and outer radius of a current state determined by a norm of a current (1-Pc,CI) pair.

Example 8 includes a system comprising a user interface to receive a query for an image, the query indicating characteristics of the image, processing circuitry coupled to the user interface, the processing circuitry configured to select a chain of algorithms configured to identify the image based on the characteristics, operate an algorithm of the selected chain of algorithms that operate in increased fidelity order on an input to produce a first result, operate a ground truth algorithm on the input to generate a second result, compare the first and second results to determine a probability of correctness (Pc) and confidence interval (CI) for the algorithm, and alter the chain of algorithms based on the determined Pc and CI.

In Example 9, Example 8 can further include, wherein the processing circuitry is further configured to select the algorithm of immediately next algorithms that maximizes a cumulative reward for the chain of algorithms, operate the immediately next algorithm of the chain of algorithms on the input, and determine, using reinforcement learning (RL), for each of the remaining algorithms respective rewards for operating using immediate next algorithms of the chain of algorithms.

In Example 10, Example 9 can further include, wherein the reward is defined as a difference between the Pc at the algorithm and a corresponding target Pc.

In Example 11, Example 10 can further include, wherein the reward is further defined as a difference between the CI at the algorithm and a corresponding target CI.

In Example 12, at least one of Examples 9-11 can further include, wherein a state space for the RL is all possible positive values of Pc and CI.

In Example 13, Example 12 can further include, wherein the state space includes concentric rings defining ranges of Pc and CI values for each algorithm in the chain of algorithms and the reward is positive only in an inner most ring of the concentric rings.

In Example 14, Example 13 can further include, wherein the reward is a difference between a terminal threshold radius and outer radius of a current state determined by a norm of a current (1-Pc,CI) pair.

Example 15 can include a non-transitory machine-readable medium including instructions that, when executed by a machine, configure the machine to perform operations comprising receiving a query for an image, the query indicating characteristics of the image, selecting a chain of algorithms configured to identify the image based on the characteristics, operating an algorithm of the selected chain of algorithms that operate in increased fidelity order on an input to produce a first result, operating a ground truth algorithm on the input to generate a second result, comparing the first and second results to determine a probability of correctness (Pc) and confidence interval (CI) for the algorithm, and altering the chain of algorithms based on the determined Pc and CI.

In Example 16, Example 15 can further include, wherein the operations further comprise selecting the algorithm of immediately next algorithms that maximizes a cumulative reward for the chain of algorithms, operating the immediately next algorithm of the chain of algorithms on the input and determining, using reinforcement learning (RL), for each of the remaining algorithms respective rewards for operating using immediate next algorithms of the chain of algorithms.

In Example 17, Example 16 can further include, wherein the reward is defined as a difference between the Pc at the algorithm and a corresponding target Pc.

In Example 18, Example 17 can further include, wherein the reward is further defined as a difference between the CI at the algorithm and a corresponding target CI.

In Example 19, at least one of Examples 16-18 can further include, wherein a state space for the RL is all possible positive values of Pc and CI.

In Example 20, Example 19 can further include, wherein the state space includes concentric rings defining ranges of Pc and CI values for each algorithm in the chain of algorithms and the reward is positive only in an inner most ring of the concentric rings and wherein the reward is a difference between a terminal threshold radius and outer radius of a current state determined by a norm of a current (1-Pc, CI) pair.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   receiving a query for an image, the query indicating characteristics of the image;
   selecting a chain of algorithms configured to identify the image based on the characteristics;
   operating an algorithm of the selected chain of algorithms that operate in increased fidelity order on an input to produce a first result;
   operating a ground truth algorithm on the input to generate a second result;
   comparing the first and second results to determine a probability of correctness (Pc) and confidence interval (CI) for the algorithm;
   determining, using reinforcement learning (RL), for each of the remaining algorithms respective rewards for operating using immediate next algorithms of the chain of algorithms, wherein the reward is defined as a difference between the Pc at the algorithm and a corresponding target Pc; and altering the chain of algorithms based on the determined Pc and CI.

2. The method of claim 1, further comprising:

selecting the algorithm of immediately next algorithms that maximizes a cumulative reward for the chain of algorithms; and operating the immediately next algorithm of the chain of algorithms on the input.

3. The method of claim 2, wherein the reward is defined as a difference between the Pc at the algorithm and a corresponding target Pc and the chain of algorithms is altered based on the respective rewards.

4. The method of claim 1, wherein the reward is further defined as a difference between the CI at the algorithm and a corresponding target CI.

5. The method of claim 2, wherein a state space for the RL is all possible positive values of Pc and CI.

6. The method of claim 5, wherein the state space includes concentric rings defining ranges of Pc and CI values for each algorithm in the chain of algorithms and the reward is positive only in an inner most ring of the concentric rings.

7. The method of claim 6, wherein the reward is a difference between a terminal threshold radius and outer radius of a current state determined by a norm of a current (I-Pc,CI) pair.

8. A system comprising:

a user interface to receive a query for an image, the query indicating characteristics of the image;

processing circuitry coupled to the user interface, the processing circuitry configured to:

select a chain of algorithms configured to identify the image based on the characteristics;

operate an algorithm of the selected chain of algorithms that operate in increased fidelity order on an input to produce a first result;

operate a ground truth algorithm on the input to generate a second result;

compare the first and second results to determine a probability of correctness (Pc) and confidence interval (CI) for the algorithm;

determine, using reinforcement learning (RL), for each of the remaining algorithms respective rewards for operating using immediate next algorithms of the chain of algorithms, wherein the reward is defined as a difference between the Pc at the algorithm and a corresponding target Pc; and alter the chain of algorithms based on the determined Pc and CI.

9. The system of claim 8, wherein the processing circuitry is further configured to:

select the algorithm of immediately next algorithms that maximizes a cumulative reward for the chain of algorithms;

operate the immediately next algorithm of the chain of algorithms on the input; and determine, using reinforcement learning (RL), for each of the remaining algorithms respective rewards for operating using immediate next algorithms of the chain of algorithms.

10. The system of claim 9, wherein the reward is defined as a difference between the Pc at the algorithm and a corresponding target Pc.

11. The system of claim 10, wherein the reward is further defined as a difference between the CI at the algorithm and a corresponding target CI and the chain of algorithms is altered based on the respective rewards.

12. The system of claim 9, wherein a state space for the RL is all possible positive values of Pc and CI.

13. The system of claim 12, wherein the state space includes concentric rings defining ranges of Pc and CI values for each algorithm in the chain of algorithms and the reward is positive only in an inner most ring of the concentric rings.

14. The system of claim 13, wherein the reward is a difference between a terminal threshold radius and outer radius of a current state determined by a norm of a current (1-Pc,CI) pair.

15. A non-transitory machine-readable medium including instructions that, when executed by a machine, configure the machine to perform operations comprising:

receiving a query for an image, the query indicating characteristics of the image;

selecting a chain of algorithms configured to identify the image based on the characteristics;

operating an algorithm of the selected chain of algorithms that operate in increased fidelity order on an input to produce a first result;

operating a ground truth algorithm on the input to generate a second result;

comparing the first and second results to determine a probability of correctness (Pc) and confidence interval (CI) for the algorithm;

determining using reinforcement learning (RL) for each of the remaining algorithms respective rewards for operating using immediate next algorithms of the chain of algorithms, wherein the reward is defined as a difference between the Pc at the algorithm and a corresponding target Pc; and altering the chain of algorithms based on the determined Pc and CI.

16. The non-transitory machine-readable medium of claim 15, wherein the operations further comprise:

selecting the algorithm of immediately next algorithms that maximizes a cumulative reward for the chain of algorithms; and operating the immediately next algorithm of the chain of algorithms on the input.

17. The non-transitory machine-readable medium of claim 16, wherein the reward is defined as a difference between the Pc at the algorithm and a corresponding target Pc.

18. The non-transitory machine-readable medium of claim 17, wherein the reward is further defined as a difference between the CI at the algorithm and a corresponding target CI and the chain of algorithms is altered based on the respective rewards.

19. The non-transitory machine-readable medium of claim 16, wherein a state space for the RL is all possible positive values of Pc and CI.

20. The non-transitory machine-readable medium of claim 19, wherein the state space includes concentric rings defining ranges of Pc and CI values for each algorithm in the chain of algorithms and the reward is positive only in an inner most ring of the concentric rings and wherein the reward is a difference between a terminal threshold radius and outer radius of a current state determined by a norm of a current (1-Pc,CI) pair.

* * * * *